(No Model.) 2 Sheets—Sheet 1.
W. H. KNAPP.
REEL RAKE FOR HARVESTERS.
No. 243,711. Patented July 5, 1881.
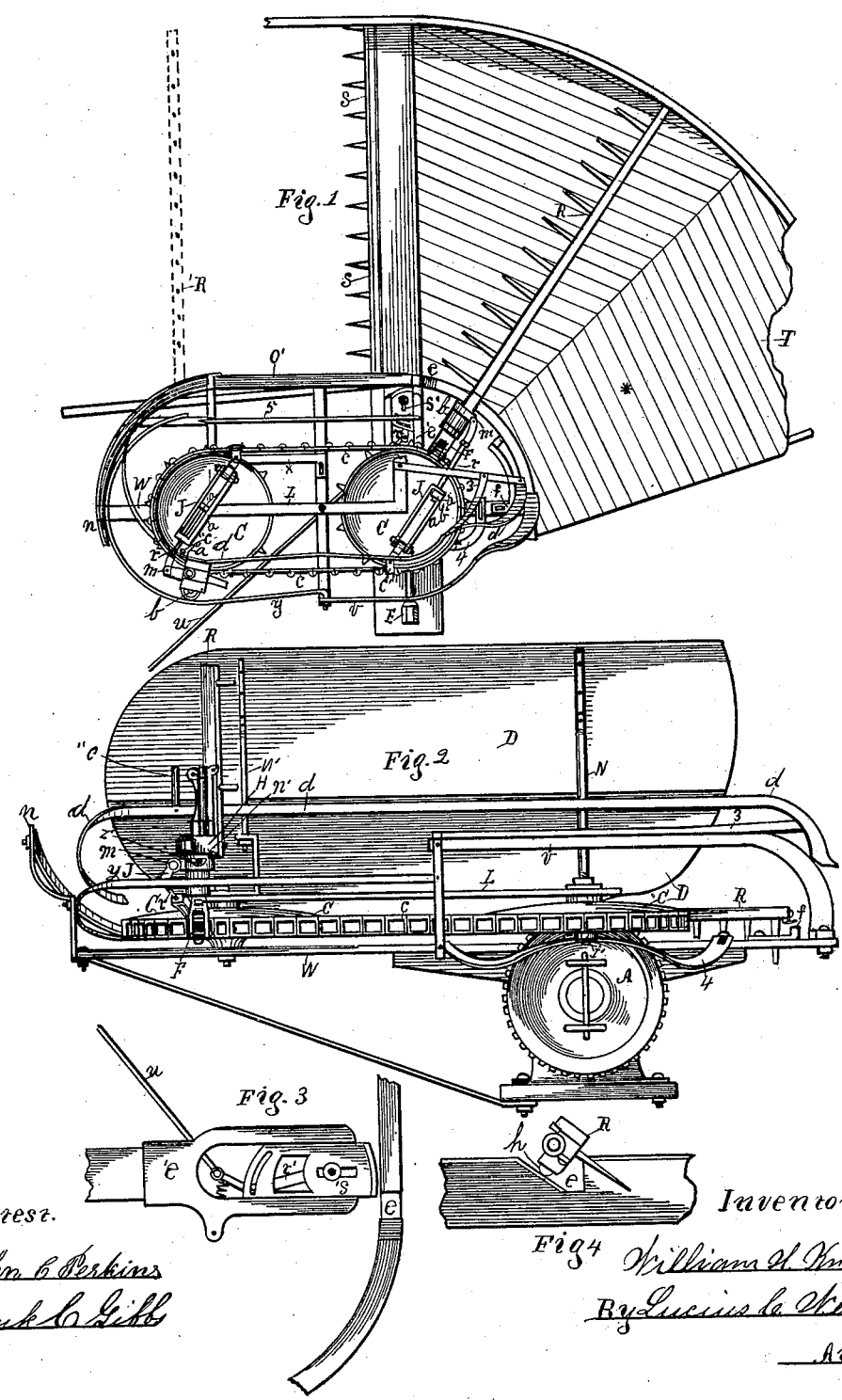

(No Model.) 2 Sheets—Sheet 2.

W. H. KNAPP.
REEL RAKE FOR HARVESTERS.

No. 243,711. Patented July 5, 1881.

Attest.
John C. Perkins
Frank C. Gibbs

Inventor.
William H. Knapp
By Lucius C. West
Atty.

UNITED STATES PATENT OFFICE.

WILLIAM H. KNAPP, OF GALESBURG, MICHIGAN.

REEL-RAKE FOR HARVESTERS.

SPECIFICATION forming part of Letters Patent No. 243,711, dated July 5, 1881.

Application filed May 6, 1881. (No model.)

*To all whom it may concern:*

Be it known that I, WILLIAM H. KNAPP, a citizen of the United States, residing at Galesburg, county of Kalamazoo, State of Michigan, have invented a new and useful Reel-Rake for Reapers, of which the following is a specification.

My invention has for its leading object a construction of reel-rakes to reaping-machines, substantially as hereinafter set forth, whereby the rakes are thrown into the grain in advance of the cutter-bar at any distance therefrom desirable, in a position horizontally parallel with said cutter-bar, and are carried in said horizontal position rearwardly back to and past the same, thus reeling all the uncut grain, lodged or otherwise, on a line directly at right angles with said cutter-bar.

Other minor objects and novel features will appear in the detailed description.

The general construction of my device consists of two sprocket-wheels bearing a chain or band, to which one or more rakes are secured, in combination with a track or way adapted for supporting and guiding the rakes in their transit around the wheels in a manner that they will strike into the grain, teeth downward, at the point desired and in the horizontal position specified, and move back to the rear of the cutter-bar, and either trip, leaving the bundle on the table, or pass on around in the usual manner of side deliverers, raking the gavel onto the ground, then pass on around to the point where they strike into the grain again.

Figure 5:
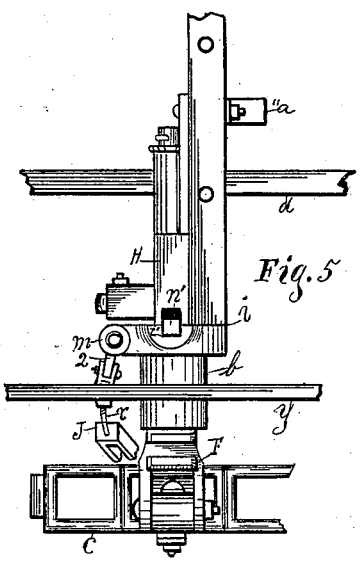
Figure 6:
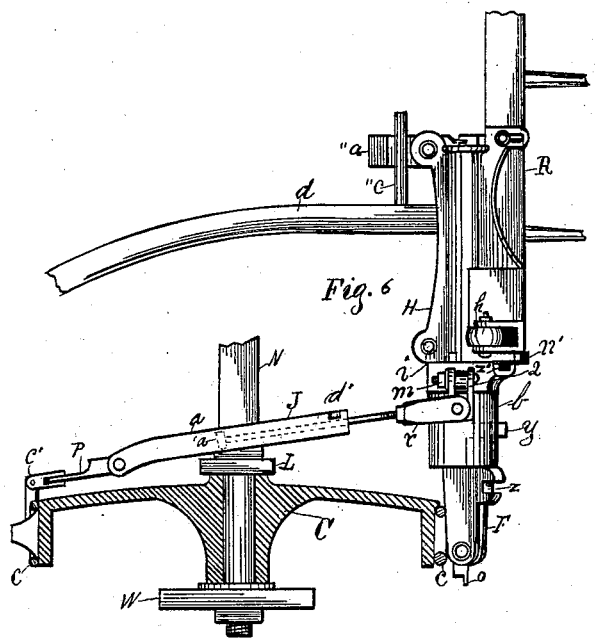
Figure 10:
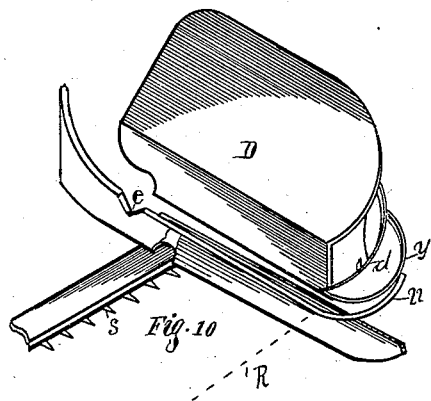
Figure 7:
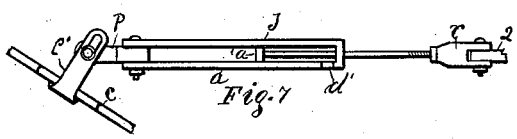
Figure 8:
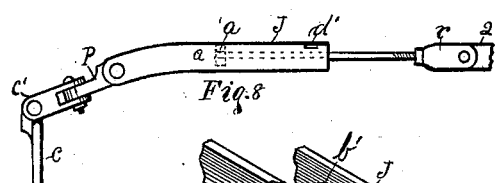
Figure 9:
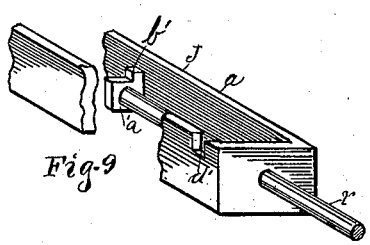
Figure 11:
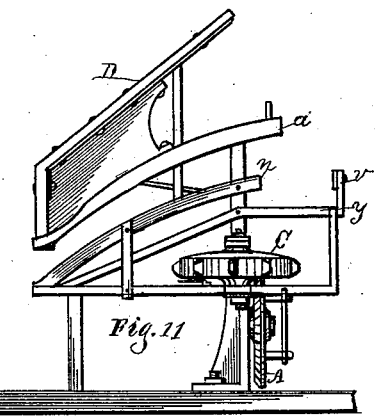

In the accompanying drawings, forming a part of this specification, in which similar letters of reference indicate like parts, Figure 1 is a top view of the device, showing the plane of the track; Fig. 2, a side elevation, looking from the side at which the driving mechanism of a reaper is located; Fig. 3, face view of a tripping device; Fig. 4, depression in the track where the tripping of the rake occurs; Fig. 5, rake-head and connections as when located at a point just to the left of stud $e$ in Fig. 2; Fig. 6, the same in the position shown in Fig. 2, with the sprocket-wheel in section on a line with draw-bar J in Fig. 1, at the left hand; Fig. 7, top view of the rake-head, draw-bar and brace; Fig. 8, side view of same; Fig. 9, broken portion of the same in perspective; Fig. 10, perspective of a cover to the machinery and view of the track on the side next to the cutter bar, and Fig. 11 end view from a point to the left of Fig. 2.

Referring to Fig. 1, T is the cutter-bar platform, and S the location of a cutter-bar as in a common construction of reapers. C C are the sprocket-wheels, having axles located in bars L W, the left-hand wheel being adjustable in regard to its distance from the other wheel by means of its axle being located in adjusting-slots in the bars L and W. E in this figure illustrates a point at which power mechanism may be connected from the running-gear of the reaper, shaft E being coupled with gear-wheel A, Figs. 2 and 11, said gear-wheel meshing with gear of the sprocket-wheel C above it. As power may be imparted to the mechanism of my device by many other methods, I do not desire this feature to have any connection with the main novelty of my invention, as I consider it purely a mechanical choice in what manner or at what point power is applied.

$c$ illustrates a sprocket-chain, to which rake-heads R are secured. This connection may be effected by bolting the casting, which is jointedly connected with portion F, Fig. 5, to the chain or whatever belt is used; or a link of the chain and the connecting portion may be both cast in one.

In the construction shown two rakes are used. The required number will depend upon the distance the two wheels C C are apart and the speed at which they revolve.

The rakes R R are similar to others already in use, which revolve around a common center in device, in which they strike into the grain at oblique angles to the cutter-bar; but some variations quite important are made to adapt them to my use.

The rake, as shown, consists of the portion bearing the teeth, the casting H, with projection $a''$, said part H being swiveled to part F, their separation being at $i$, Figs. 5 and 6. $h$ and $b$ are friction-wheels; $z$, a recess, and $o$ a projection, hereinafter explained.

To the rake-head casting F, at $m$, I jointedly connect an automatically-adjustable draw-bar and brace, J, the opposite end thereof being jointedly connected with the chain $c$ to portion $c'$, at a point obliquely opposite the point at which portion F of the rake-head connects with chain c when rake R is in position shown in Figs. 1, 2, and 6. This draw-bar J consists of part r, having head a', said rod r being movably inserted in a hole through the end of stirrup or recessed bar a. Bar a has a recess or notch, d', adapted to receive the projection b' of head a', explained in the operation. Part P is made with the face of the ends at right angles with each other, and are thus jointedly connected with parts c' and a. Part c' is slotted in order to adjust the length of the bar J, Fig. 7. Part 2 also has each end jointedly connected, at right angles with each other, to parts r and F, the latter connection being at m. This construction of the draw-bar J adapts it to conform to varying angles of the rake R during the operation.

Referring to Figs. 2 and 10, D is the cover to the mechanism, guarding it from the grain, supported by brackets or bars N' N. 4 is a bar bearing a friction presser-wheel, I', near its center, which causes the gear of wheel A to mesh with the gear of wheel C above it. This bar 4 is slotted at one end, Fig. 1, for adjusting the degree of pressure of the presser-wheel I' against wheel A.

The rake track or way, described in a general manner, consists of two parallel bars extending entirely around the wheels C C and above them, except on the cutter-bar side the track is a little lower than a horizontal plane with the chain-wheels, and on this one bar is broken up; but the way will be better understood by the detailed description in connection with the operation, as follows:

Referring to Fig. 1, considering rake R in the position shown by dotted lines R', where it has struck into the uncut grain in the previously-specified horizontally-parallel position with cutter-bar S, as it moves along, recess z, Fig. 6, engages or slides along over bar 5, Fig. 1, and projection o, Fig. 6, catches under bar x, Fig. 1, thus preventing chain c from unduly swaying, and also assisting in supporting rake R, obviating any liability of the rake-teeth conflicting with the sickle S. When the rake arrives at the depression e in the track, Figs. 4 and 10, if plate s' of the tripping device is in the position shown in Figs. 1 and 3, the rake will trip, Figs. 1 and 4, as plate s', engaging tongue n' of the casting H, Figs. 5 and 6, will force said tongue out of its recess z', Figs. 2 and 6, unlocking it and allowing the rake to turn in its swiveled joint i, when said rake trips and passes over the grain, which is done until enough collects to form a bundle, when, by pulling on rod u, Figs. 1, 3, which draws plate s' away from the track, the rake will not trip, but will rake the gavel back farther on the table. From this point e around up the ascending incline of the way the automatically-adjustable draw-bar and brace J comes into especial service in assisting to draw the rake R, it now being extended to its farthest capacity, Fig. 1, and the projection b' of the headed rod r is locked in its recess d'.

As the rake passes on, if unallowed to trip at e, it will trip as soon as it commences to ascend bar v between it and bar d or bar f, Fig. 1, will have acted upon tongue n' in the same manner as plate s', unlocking joint i and leaving the gavel at the point indicated by * on table T.

Bar f has an adjusting-slot in its shouldered end, by means of which it can be located at the exact distance required at all times from track o'. Bar 3 is provided to obviate any danger of the rake-head turning and becoming locked in its upward ascent to a perpendicular angle, which point is attained when nearly over wheel A. Bar y is a continuation of bar v, but lower, in order to clear the casting H of the rake, and allow it to turn again and lock, which it does by bar a'' engaging stud c'', Figs. 1 and 6. Fig. 5 shows the rake after it has passed stud c'', where the tongue n' has locked in its recess z'. The casting H, in which the tongue n' is located, has a spring therein, which operates said tongue. The rake now passes on down the descending incline of the way on an oblique angle, between bars d and n, Figs. 1, 2, 10, and 11, striking into the grain again in a horizontal position when reaching the point shown by dotted lines at R'. Referring back to the right-hand side of the way in Fig. 1, soon after the rake has passed the gavel, the draw-bar unlocks at b', and soon it begins to shorten, as seen in Figs. 1, 6, and 8. Thus the draw-bar, by means of this feature and its joint, accommodates itself to the varying angles and positions assumed by the rake-arm.

What I claim, and desire to secure by Letters Patent, is—

1. The wheels carrying the chain, with the rakes secured thereto, in combination with the track or way adapted for guiding and supporting said rakes and throwing them into the grain and carrying them back to the cutter-bar in the parallel position thereto set forth, all substantially as specified and shown.

2. The wheels and chain or band carrying rakes, the guiding and supporting track, and means for operating said wheels and rakes to effect the object set forth, all substantially as described.

3. The automatically-adjustable compound draw-bar and brace, consisting of the recessed center bar with the notch in one side, the swiveled bar having the head with the projection adapted for locking with said notch, and the bars which jointedly unite each end of the device with its connections, all substantially as described and shown.

4. The compound draw-bar and brace, having the recessed center bar with the locking-notch, and the swiveled bar, provided with the head having the projection for locking with said notch, in combination with the rakes and the chain carrying them, substantially as set forth.

5. The rake-head having the end connecting with the chain or belt, provided with recess z and projection o, in combination with bars o', 5, and x of the track, substantially as set forth.

6. The bars which support the axles of the chain-wheels, having the frame or brackets for supporting the guard or cover of the device connected therewith, in combination with said guard, substantially as described, for the purpose specified.

7. The band carrying the rakes and provided with the draw-bar brace, in combination with the means for tripping the rake, substantially as specified and shown.

8. The track or way, the inner bar of which is provided with the stud for turning the rake-head, in combination with a rake-head having the swiveled joint and locking device, and the extending bar for engaging with said stud in turning the rake, all substantially as set forth.

9. The track or way consisting of the guide-bars $v$, $y$, $d$, N, and $o'$, supporting-bars 5 and $x$, adjustable tripping-bar $f$, and bar 3, formed, located, and arranged to effect the objects set forth, all substantially as shown.

10. In a reaper reel and rake, the wheels and chain carrying rakes, in combination with means for guiding, supporting, turning, and tripping said rake or rakes and throwing them in the grain in the parallel position to the cutter-bar specified, all substantially as described.

11. The wheels and chain or band carrying the rakes, the way adapted for guiding and supporting said rakes in their transit, and having the depression and other specified means or equivalents for tripping the rakes, all in combination with the platform of a grain-reaper, substantially as set forth.

WILLIAM H. KNAPP.

Witnesses:
GEO. M. BUCK,
FRANK C. GIBBS.